United States Patent [19]

Hebel

[11] Patent Number: 5,153,819
[45] Date of Patent: Oct. 6, 1992

[54] QUICK CONNECT FRAME
[75] Inventor: Gregory F. Hebel, Chicago, Ill.
[73] Assignee: Homaco, Inc., Chicago, Ill.
[21] Appl. No.: 692,734
[22] Filed: Apr. 29, 1991
[51] Int. Cl.[5] ............................................. H02B 1/01
[52] U.S. Cl. ..................................... 361/429; 174/38; 361/428; 379/327
[58] Field of Search .................... 211/26, 392, 394; 361/426, 428, 429; 379/327; 439/709, 715, 716, 718, 727, 719, 532; 174/38, 44, 72 R

[56] References Cited

U.S. PATENT DOCUMENTS

| | | | |
|---|---|---|---|
| 816,847 | 4/1906 | Cook | 379/327 |
| 2,098,321 | 11/1937 | Treptow | 361/428 |
| 3,521,129 | 7/1970 | McKenzie, Jr. | 361/428 |
| 4,158,754 | 6/1979 | Yonezaki et al. | 379/328 |
| 4,313,039 | 1/1982 | DeLuca et al. | 379/327 |
| 4,497,411 | 2/1985 | DeBortoli | 361/428 |
| 4,759,057 | 7/1988 | DeLuca et al. | 361/428 |
| 4,904,211 | 2/1990 | Meyerhoefer et al. | 361/428 |

Primary Examiner—Leo P. Picard
Assistant Examiner—D. Sparks
Attorney, Agent, or Firm—Anthony S. Zummer

[57] ABSTRACT

An improved construction for a quick connect frame used for interconnecting a plurality of wires, which wires are part of a communication system, is the subject matter of this invention. The quick connect frame includes a pair of interconnected uprights. The uprights are held in a substantially vertical attitude. A vertical cable path is positioned adjacent to one of the uprights. A plurality of block modules is mounted on one side of the uprights. The one side of the uprights defines a substantially vertical upright plane. A set of terminating blocks is mounted on each of the block modules. Each set of terminating blocks on each block module is in one substantially vertical block plane, which block plane is spaced from and substantially parallel to the vertical upright plane. A horizontal jumper path is positioned adjacent to each set of terminating blocks. Each horizontal jumper path has a portion above its respective set of terminating blocks and a portion between the set of terminating blocks and the vertical upright plane. Each set of terminating blocks has a vertical jumper path to one side of each of the terminating blocks, which vertical jumper path is positioned between the vertical upright plane and the vertical block plane of the respective set of terminating blocks.

17 Claims, 5 Drawing Sheets

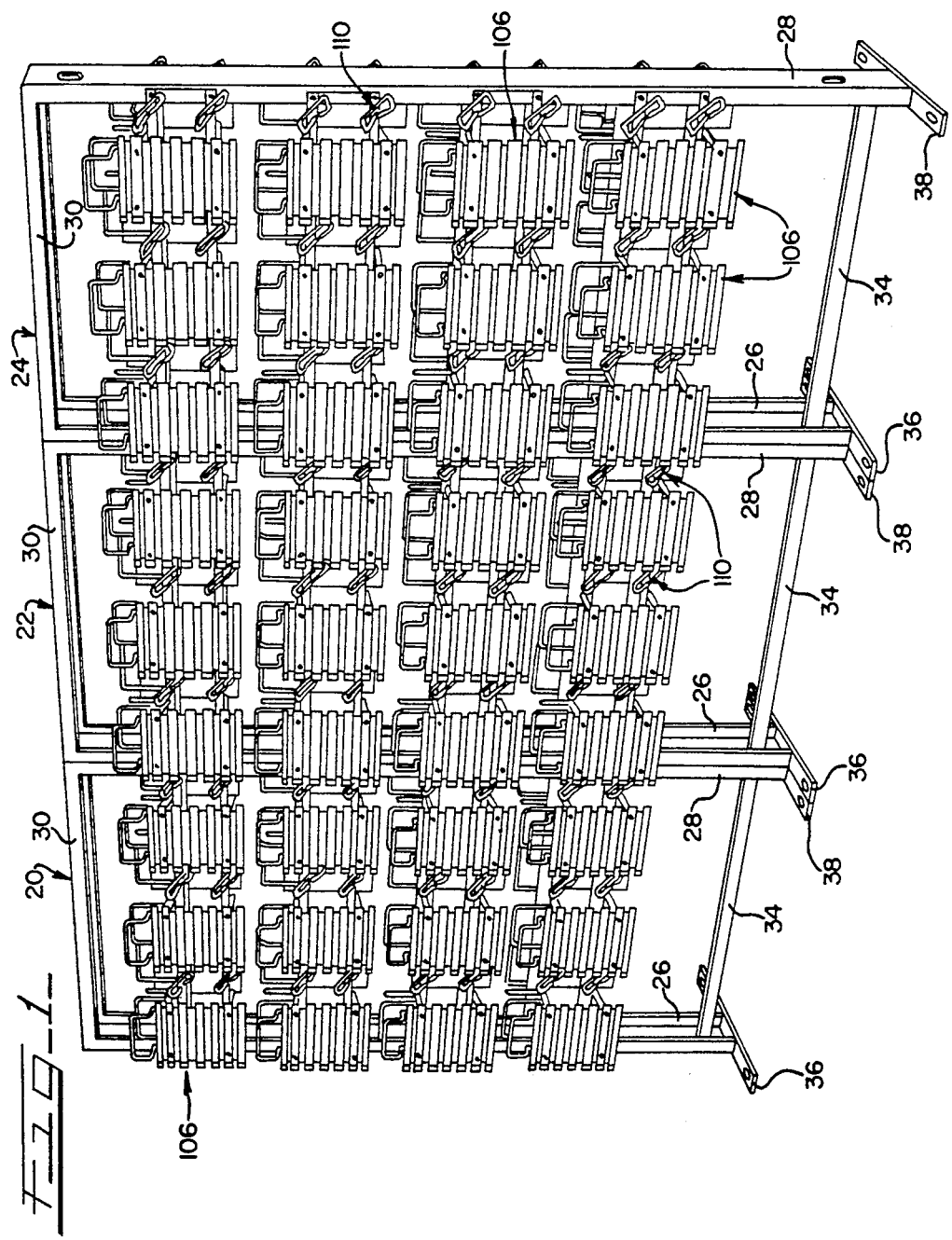

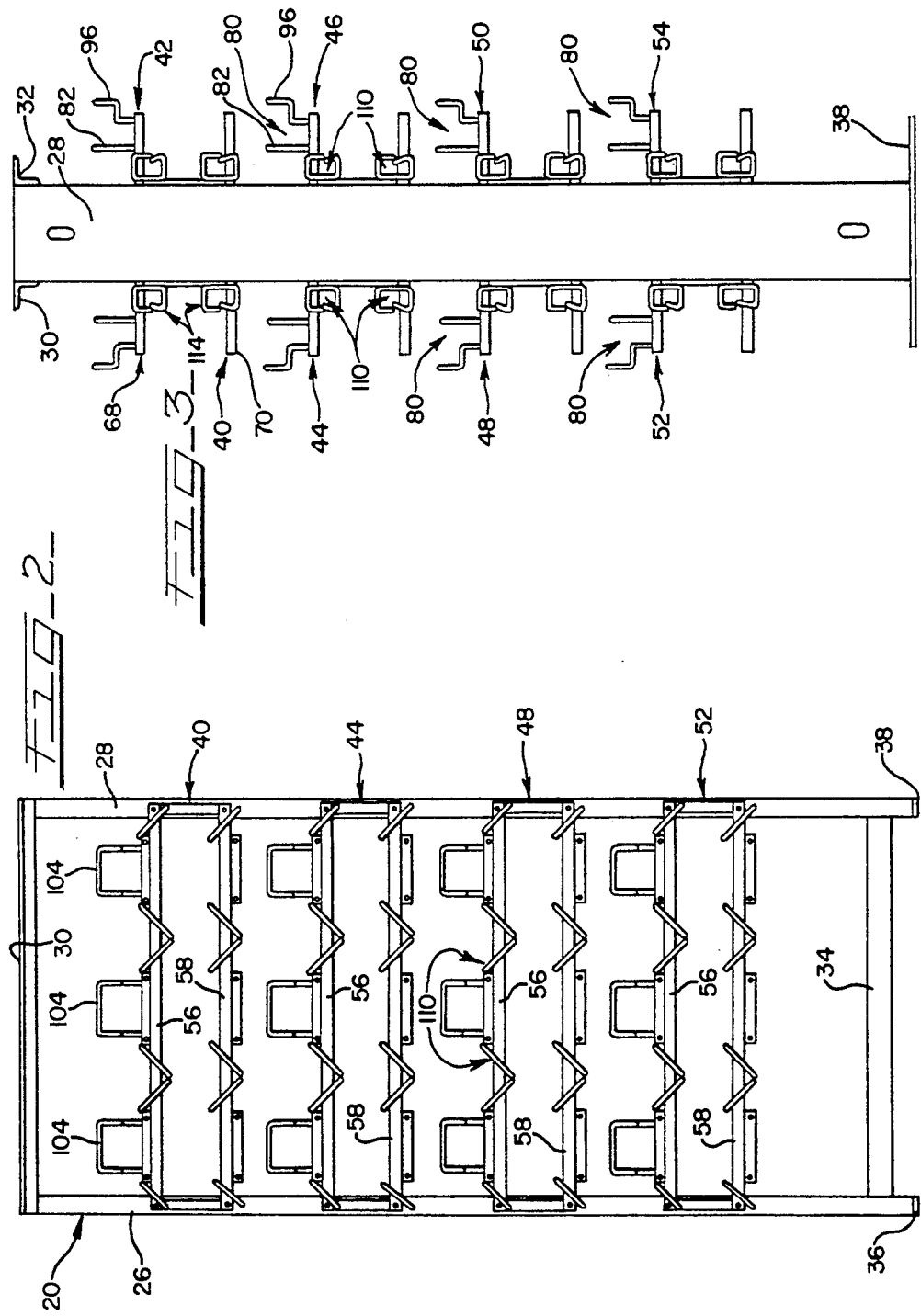

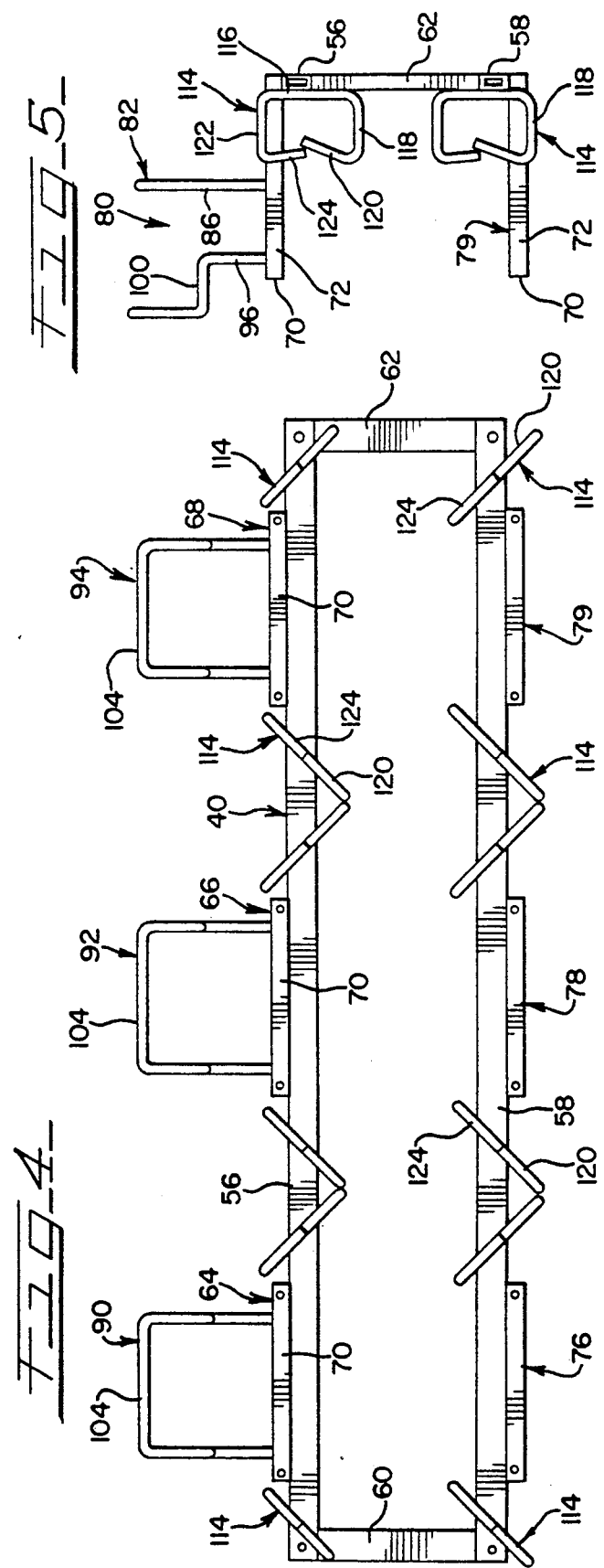

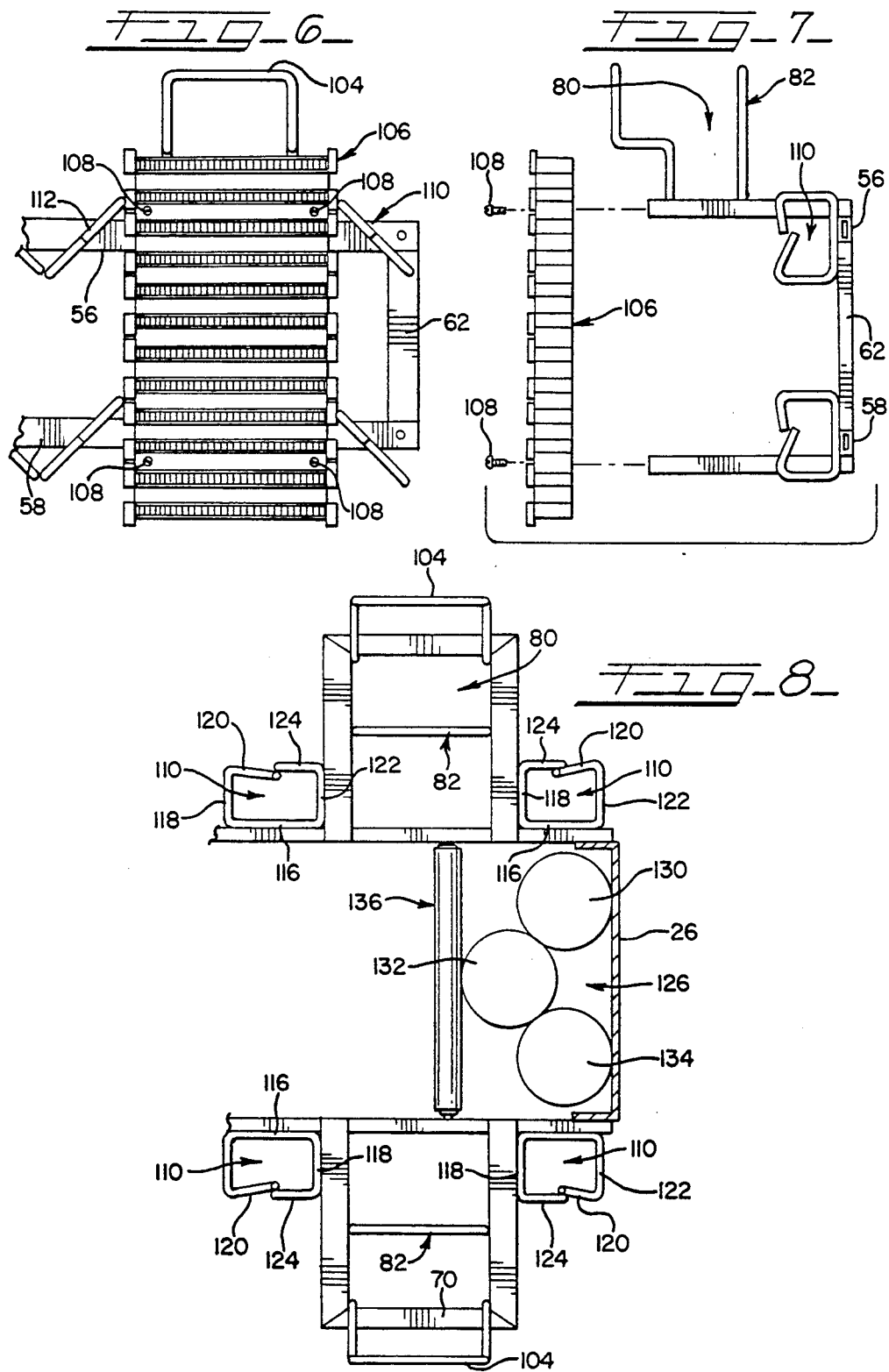

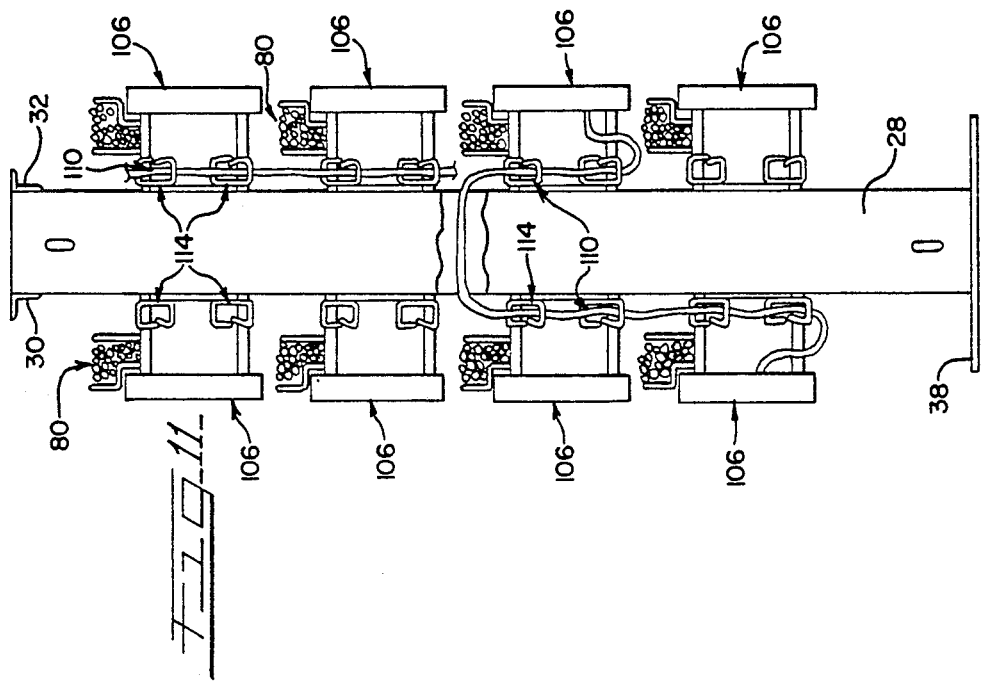
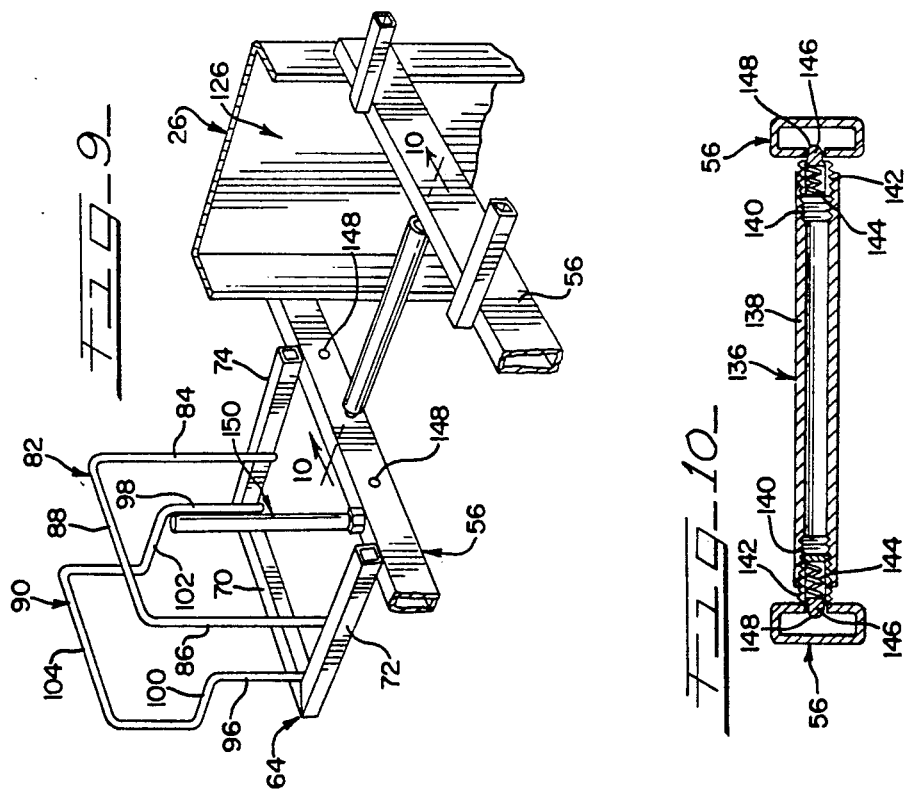

QUICK CONNECT FRAME

BACKGROUND OF THE INVENTION

A quick connect frame is a well known device commonly used for wire distribution in a communication system. A well known construction for such a quick connect frame is disclosed in U.S. Pat. No. 4,641,754 issued Feb. 10, 1987, to Gregory F. Hebel and Greg A. Temkin entitled, "Quick Connect Frame."

Wire distribution systems typically utilize a plurality of well known terminating blocks mounted on block modules for interconnecting wires of a communication system. The block modules typically are mounted on a pair of uprights and arranged in a vertical plane parallel to the uprights. In a typical installation, each terminating block may receive up to 300 pairs of wires, and each frame may have from 12 to 27 blocks mounted on each of two opposite sides. The large number of wires takes up a substantial amount of space, so that commonly there is a problem managing all of the wires within a confined space. Space management of the wires connected at a quick connect frame presents a problem for those who design quick connect frames as well as those who use them. It is possible to make quick connect frames taller to accommodate more wires. However, the height of a quick connect frame is limited by the ordinary reach of an ordinary installer. Also, the height of a quick connect frame is often limited to the height of the equipment room ceiling. In some installations, compatibility with other equipment heights would limit the height of the quick connect frame. It is therefore particularly desirable to have terminating blocks, which are mounted on a pair of uprights, positioned close to each other in a vertical direction so that an ordinary installer may readily reach the uppermost blocks. Furthermore, it is desirable to keep the lowermost blocks a suitable distance above the floor so that an installer can bend over to the blocks with relative ease.

In addition, it is desirable to provide a vertical jumper path along side of each of the terminating blocks so that the wires may be handled conveniently and expeditiously.

It is also desirable to provide an improved arrangement of the parts of a quick connect frame wherein the backside of each of the terminating blocks may be readily inspected. In addition, each of the terminating blocks must be capable of being disconnected from its respective block module to allow additional inspection of the back of the block without removing other terminating blocks, but more importantly, to allow removal of a damaged block and full replacement without disturbing other blocks located on that module.

One of the objects of the present invention is to provide an improved quick connect frame which has a improved horizontal jumper path to manage in a efficient manner wires which are connected to the frame.

Another object of the instant invention is to provide an improved quick connect frame having an improved location for a vertical jumper path adjacent to each of the terminating blocks.

A still further object of the herein disclosed invention is to provide an improved quick connect frame construction which allows easy inspection of each terminating block and easy disengagement of each block from its block module without disturbing other terminating blocks.

Other objects and uses of this invention will become readily apparent to those skilled in the art upon a consideration of the accompanying drawings in light of the following specification.

SUMMARY OF THE PRESENT INVENTION

The present invention is directed to a quick connect frame having an improved construction. The instant quick connect frame is part of a communication system having interconnected wires. The frame includes a pair of uprights, which uprights are interconnected and are held in a substantially vertical attitude. A vertical cable path is positioned adjacent to one of the uprights. A plurality of block modules spans one side of the uprights. The side of the uprights having the block modules mounted thereon defines a substantially vertical upright plane. A set of well known terminating blocks is mounted on each of the block modules. Each set of terminating blocks on each block module is in one substantially vertical block plane spaced from and substantially parallel to the vertical upright plane. A horizontal jumper path which receives wires from the vertical cable path is positioned adjacent to each set of terminating blocks. Each horizontal jumper path has one portion above its respective set of terminating blocks and another portion between the respective set of terminating blocks and the vertical upright plane. Each terminating block has a vertical jumper path positioned to side thereof. Each vertical jumper path receives wires from its respective horizontal jumper path. Each vertical jumper path is positioned between the vertical upright plane and the vertical block plane of the respective set of terminating blocks.

BRIEF DESCRIPTION OF THE DRAWINGS

FIG. 1 is a perspective view of three quick connect frames, each embodying the herein disclosed invention, which frames are connected in line as in a typical installation;

FIG. 2 is a vertical elevational view of one of the quick connect frames of FIG. 1 having cabling and terminating blocks removed in order to show better the positioning of block modules and block support members;

FIG. 3 is side elevational view of the quick connect frame of FIG. 2 also with cabling and blocks removed;

FIG. 4 is an enlarged front elevational view of one of the block modules shown mounted on a pair of uprights in FIG. 2;

FIG. 5 is a side elevational view of the block module of FIG. 4;

FIG. 6 is a front elevational view of portion of a block module with a terminating block mounted thereon;

FIG. 7 is a side elevational view of block module of FIG. 6 but with the terminating block and mounting screws shown exploded away from the block module;

FIG. 8 is a top cross sectional view through an upright showing a portion of each of a pair of opposed block modules with terminating blocks and wires removed, and a cable retention bar positioned adjacent to an upright;

FIG. 9 is a perspective view of fragmentary portion of an upright with block modules attached to the upright and a cable retention bar between the block modules;

FIG. 10 is an enlarged cross sectional view taken on line 10—10 of FIG. 9 showing the interior construction of the cable retention bar; and FIG. 11 is a side elevational view similar to FIG. 3 but with blocks mounted in position and some wires shown diagrammatically to illustrate positioning of some of the wires in horizontal jumper paths as well as in some vertical jumper paths.

DESCRIPTION OF THE SPECIFIC EMBODIMENT

Referring now to the drawings and especially to FIG. 1, three quick connect frames 20, 22, and 24 are shown in a typical installation wherein the three quick connect frames are interconnected by conventional and well known means. The quick connect frames 20, 22 and 24 are identical to each other. Only frame 20 is described in detail hereinafter. Quick connect frame 20 is a double sided quick connect frame.

Although a double sided quick connect frame is described in detail hereinafter, the improvements disclosed are applicable to a single sided quick connect frame as well. It is to be understood that cables, jumpers and wires are not shown in FIG. 1 as well as in some of the other figures inasmuch as the illustration of the cables, jumpers and wires would do no more than obscure the construction of the quick connect frame.

As may be seen in FIGS. 2 and 3, quick connect frame 20 generally includes a pair of connected uprights 26 and 28 which are interconnected at their uppermost ends by top angles 30 and 32; a bottom angle 34 interconnects the lower portion of the uprights. A foot 36 is mounted on the bottom of upright 26, and a foot 38 is mounted on the bottom of upright 28. Feet 36 and 38 keep the uprights in a substantially vertical attitude as may be seen in FIGS. 3 and 11. A substantially vertical upright plane is defined on each side of uprights 26 and 28 so that a vertical upright plane extends between uprights 26 and 28 on one side and a second vertical upright plane extends between uprights 26 and 28 on the other side of the uprights.

A plurality of identical terminating block modules is mounted on each side of the uprights 26 and 28 as may be seen in FIG. 3. An upper block module 40 is mounted on one side of the uprights 26 and 28, and an identical opposed upper block module 42 is mounted on the other side of the uprights. An upper intermediate block module 44 is mounted on one side the uprights below block module 40, and a like opposed upper intermediate block module 46 is mounted on the other side of the uprights opposite block module 44 and below upper block module 42. A lower intermediate block module 48 is mounted on the one side of the uprights below upper intermediate block module 44 and on the same side thereof, and an opposed lower intermediate block module 50 is mounted below block module 46 on the same side of the uprights as block module 46. A lower block module 52 is mounted on the one side of the uprights below lower intermediate block module 48, and an opposed lower block module 54 is mounted on the uprights below lower intermediate block module 50 and on the same side of the uprights as block 50. As was mentioned above, the construction of each of the block modules is identical to each other block module.

Referring now to FIGS. 4 and 5, the specific construction of block module 40 is shown therein. The construction of block module 40 is identical to the other block modules. Block module 40 includes an upper cross support 56 which in this instance is one-half inch by one inch rectangular steel tubing. A lower cross support 58 is identical to the upper cross support. The upper and lower cross supports 56 and 58 are interconnected by posts 60 and 62 which are fixed to the cross supports as may be seen in FIGS. 4 and 5. Posts 60 and 62 are also one-half inch by one inch rectangular steel tubing.

Block module 40 has three identical upper support members 64, 66 and 68 mounted on upper cross support 56. The construction of upper support members 64, 66 and 68 is identical. Upper support member 64 includes a horizontal block mounting bar 70 integral bar legs 72 and 74 made of one piece of one-half inch by one-half inch tubing which is miter cut and formed into the integral parts. Lower support members 76, 78 and 79 are mounted on lower cross support 58 and are vertically aligned with upper support members 64, 66 and 68, respectively. Lower support members 76, 78 and 79 have the same construction as upper support member 64 described in detail herein.

Block module 40 has a horizontal jumper path 80 above upper support members 64, 66 and 68. Horizontal jumper path 80 is defined on its inner side by three identical horizontal jumper retaining rings 82. Each of the rings has a pair of upright ring legs 84 and 86 which are formed integral with opposite ends of a ring connector 88. Each horizontal jumper retaining ring is formed of a conventional wire rod. Ring legs 84 and 86 are fixed to bar legs 74 and 72, respectively. Horizontal jumper path 80 is defined on its outer side by three identical offset horizontal jumper retaining rings 90, 92 and 94. As may be seen in FIG. 9, offset horizontal retaining ring 90 is also a unitary wire rod which includes ring legs 96 and 98 with offsets 100 and 102, respectively, formed therein. A front ring connector 104 has its opposite ends formed integral with the upper ends of ring legs 96 and 98. Ring legs 96 and 98 are fixed to upper support member 64.

As may be best seen in FIG. 1, a set of conventional and well known identical terminating blocks 106 is mounted on block module 40. Each terminating block 106 is secured to its respective upper and lower support members by conventional machine screws 108 so that each terminating block may be quickly and readily removed from its respective upper and lower support members. As may be seen in FIG. 11, mounting of the terminating blocks on the respective upper and lower support members of the respective block module places each set of terminating blocks in one substantially vertical block plane which is spaced from the vertical upright plane of the side of the uprights adjacent to the terminating blocks. The vertical block plane is substantially parallel to that vertical upright plane.

A vertical jumper path is positioned on each side of each terminating block. A specific illustration of vertical jumper paths is shown in FIGS. 1, 4, 5, 6 and 11. As may be seen in FIG. 6, a vertical jumper path 110 is positioned on one side of terminating block 106, and another parallel vertical jumper path 112 is positioned on the other side of terminating block 106. Each vertical jumper path is defined by identical vertical jumper retaining rings 114 as may be seen in FIGS. 4 and 5. Each vertical jumper retaining ring 114 is a unitary metal rod which includes a mounting rod 116 which is selectively secured to either upper cross support 56 or lower cross support 58. A generally horizontally extending lower support rod 118 is formed integral with the lower end of mounting rod 116. A generally upwardly extending lower catch 120 is formed integral with lower support rod 118. A generally horizontally extending upper rod 122 is formed integral with the upper end of mounting rod 116. A generally downwardly extending upper catch 124 is formed integral with upper rod 122. It may be seen in FIG. 5 that upper catch and lower catch are separated to provide a split which allows wires to be positioned in the vertical jumper retaining ring and thereby hold wires in the vertical jumper path.

The uprights 26 and 28 are U-channels. Upright 26 provides a vertical cable path 126 which receives conventional cables 130, 132 and 134, which cables are shown diagrammatically. A cable retainer bar 136 is shown mounted between opposed block modules in FIG. 8. The cable retainer bar which is best seen in FIG. 10 generally consists of a cable retainer bar body 138 which has opposed threaded ends 140. A spring housing 142 is threadedly mounted in each of the threaded ends 140. A compression spring 144 is mounted in each of spring housings 142 with a plunger 146 mounted in each housing. Each plunger 146 is pushed outward by its respective compression spring to fit into a selected mounted aperture 148 of its respective block module.

A vertical guide pin 150 is mounted on upper cross support 56 adjacent to upright 26 for retaining wires (not shown) from a cable positioned in an adjacent vertical cable path.

As is conventional, cables are brought into the quick connect frame in vertical cable path 126. The wires are pulled from the cable into horizontal jumper path 80. The wires then are directed into selected vertical jumper paths. The wires are selected from the vertical jumper path and are connected to selected terminating blocks as conventional.

Each horizontal jumper path has a portion which is above its respective set of terminating blocks and a portion between the plane of the respective set of terminating blocks and the vertical upright plane. The vertical distance between adjacent sets of terminating blocks may be decreased without any loss in capacity thereby improving wire management in the quick connect frame. In addition, the wires from each horizontal jumper path are directed vertical in the vertical jumper paths on either side of the respective terminating blocks so that the wires are either to one side of the respective terminating blocks or the other but between the plane of the set of terminating blocks and the vertical upright plane defined by the adjacent side of the uprights.

Once the terminating blocks are wired with their appropriate wire pairs, some blocks may have up to 300 wire pairs. The back of each of the terminating blocks may be readily inspected. Additions, modifications and inspections of the blocks may be accomplished by the removal of the four screws 108 and moving of the block outward away from the uprights. Thus, it is not necessary to disturb other terminating blocks mounted on the frame in order to make an inspection, modification or adjustment to one of the terminating blocks.

As was mentioned above, the present invention has been disclosed for a double sided quick connect frame. It is evident that the same basic construction may be utilized with a single sided quick connect frame which frame may be mounted against a wall. One skilled in the art would have no difficulty in understanding the construction and operation of the instant invention even though the cables, jumpers and wires are not fully illustrated herein. It is understood that one skilled in the art knows and understands the construction and operation of terminating blocks and wiring thereto.

Although a specific embodiment of the herein disclosed invention has been described in detail above and is shown in detail in the accompanying drawings, it is readily apparent that those skilled in the art may make a variety of modifications and changes in the quick connect frame construction disclosed herein without departing from the spirit and scope of this invention. It is to be expressly understood that the present invention is limited only by the appended claims.

What is claimed is:

1. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, upright plane, a set of terminating blocks mounted on each of said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, one of said uprights is a U-channel defining a portion of said vertical cable path, and a cable retention bar fixed relative to said U-channel for holding a cable in said U-channel.

2. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, and a vertical jumper retaining ring adjacent to one side of each terminating block defining a portion of the respective vertical jumper path, each vertical jumper retaining ring mounted on the respective block module receiving the respective terminating block.

3. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, and a vertical jumper retaining ring adjacent to one side of each terminating block, each vertical jumper retaining ring mounted on the respective block module of the respective terminating block, a portion of each vertical jumper retaining ring being split for receiving wires through the split in the ring, each vertical jumper retaining ring being set at an angle relative to the vertical to define a portion of the respective vertical jumper path.

4. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, and a guide pin mounted on a block module, said guide pin being substantially vertical for retaining wires from a cable positioned in an adjacent vertical cable path.

5. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, one of said uprights is a U-channel defining a portion of said vertical cable path, and a cable retention bar fixed relative to said U-channel for holding a cable in said U-channel.

6. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, and a vertical jumper retaining ring adjacent to one side of each terminating block defining a portion of the respective vertical jumper path, each vertical jumper retaining ring mounted on the respective block module of the respective terminating block.

7. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, and a vertical jumper retaining ring adjacent to one side of each terminating block, each vertical jumper retaining ring being split for receiving wires through the split in the ring, each vertical jumper retaining ring mounted on the respective block module of the respective terminating block and being set at an angle relative to the vertical to define a portion of the respective vertical jumper path.

8. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, and a guide pin mounted on the upper portion of a block module, said guide pin being substantially vertical for retaining wires from a cable positioned in an adjacent vertical cable path.

9. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, one of said uprights is a U-channel defining a portion of said vertical cable path, a cable retention bar fixed relative to said U-channel for holding a cable in said U-channel, and a vertical jumper retaining ring adjacent to one side of each terminating block defining a portion of the respective vertical jumper path, each vertical jumper retaining ring mounted on the respective block module of the respective terminating block.

10. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, one of said uprights is a U-channel defining a portion of said vertical cable path, and a cable retention bar fixed relative to said U-channel for holding a cable in said U-channel, and a vertical jumper retaining ring adjacent to one side of each terminating block and being set at an angle relative to the vertical to define a portion of the respective vertical jumper path, each vertical jumper retaining ring being split for receiving wires through the split in the ring.

11. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, one of said uprights is a U-channel defining a portion of said vertical cable path, a cable retention bar fixed relative to said U-channel for holding a cable in said U-channel, and a guide pin mounted in the upper portion of a block module, said guide pin being substantially vertical for retaining wires from a cable positioned in an adjacent vertical cable path.

12. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, a vertical jumper retaining ring adjacent to one side of each terminating block, each vertical jumper retaining ring mounted on the respective block module of the respective terminating block and being set at an angle relative to the vertical to define a portion of the vertical jumper path, each vertical jumper retaining ring being split for receiving wires through the split in the ring, and a guide pin mounted on the upper portion of a block module, said guide pin being substantially vertical for retaining wires from a cable positioned in an adjacent vertical cable path.

13. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, one of said uprights is a U-channel defining a portion of said vertical cable path, and a cable retention bar fixed relative to the U-channel for holding a cable in the vertical cable path, and a vertical jumper retaining ring adjacent to one side of each terminating block, each vertical jumper retaining ring mounted on the respective block module of the respective terminating block.

14. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane, one of said uprights is a U-channel defining a portion of said vertical cable path, a cable retention bar fixed relative to the U-channel for holding a cable in the vertical cable path, and a vertical jumper retaining ring adjacent to one side of each terminating block, each vertical jumper retaining ring mounted on the respective block module of the respective terminating block and being set at an oblique angle relative to the vertical to define a portion of the respective vertical jumper path, each vertical jumper retaining ring being split for receiving wires through the split in the ring.

15. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, each horizontal jumper path includes an offset horizontal jumper retaining ring having a portion extending above the respective set of terminating blocks, a horizontal jumper retaining ring positioned between the offset horizontal jumper retaining ring and the vertical upright plane and being substantially parallel to the vertical upright plane, one of said uprights is a U-channel defining a portion of said vertical cable path, a cable retention bar fixed relative to the U-channel for holding a cable in the vertical cable path, and a guide pin mounted on the upper portion of a block module, said guide pin being substantially vertical for retaining wires from a cable positioned in an adjacent vertical cable path.

16. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, one of said uprights is a U-channel defining a portion of said vertical cable path, a cable retention bar fixed relative to said U-channel for holding a cable in said U-channel, a vertical jumper retaining ring adjacent to one side of each terminating block, each vertical jumper retaining ring mounted on the respective block module of the respective terminating block and being set at an oblique angle relative to the vertical to define a portion of the respective vertical jumper path, each vertical jumper retaining ring being split for receiving wires through the ring, and a guide pin mounted on the upper portion of a block module, said guide pin being substantially vertical for retaining wires from a cable positioned in an adjacent U-channel.

17. In a quick connect frame for use in interconnecting a plurality of wires, said wires being a part of a communication system, said frame having a pair of uprights, means for connecting the uprights to each other, means for holding the uprights in a substantially vertical attitude, a vertical cable path adjacent to one of said uprights, a plurality of block modules mounted on one side of the uprights, said one side of the uprights defining a substantially vertical upright plane, a set of terminating blocks mounted on each of the block modules, each set of terminating blocks on each block module being in one substantially vertical block plane spaced from and substantially parallel to the vertical upright plane, the improvement comprising: a horizontal jumper path adjacent to each set of terminating blocks, each horizontal jumper path having a portion above its respective set of terminating blocks and a portion between the respective set of terminating blocks and said vertical upright plane, each set of terminating blocks having a vertical jumper path to one side of each terminating block of the respective set of terminating blocks and between said vertical upright plane and the vertical block plane of the respective set of terminating blocks, the spacing between the side of each terminating block adjacent to the vertical upright plane and said vertical upright plane is sufficient to allow inspection of that side of the terminating block when the terminating block is mounted on its respective block module, each terminating block being removable from its respective block module by disconnecting it from its block module and moving it away from the vertical upright plane, each horizontal jumper path includes an offset horizontal jumper retaining ring having a portion extending above the respective set of terminating blocks, a horizontal jumper retaining ring positioned between the offset horizontal jumper retaining ring and the vertical upright plane and being substantially parallel to the vertical upright plane, one of said uprights is a U-channel defining a portion of said vertical cable path, and a cable retention bar fixed relative to the U-channel for holding a cable in the U-channel, a vertical jumper retaining ring adjacent to one side of each terminating block, each vertical jumper retaining ring mounted on the respective block module of the respective terminating block, each vertical jumper retaining ring being split for receiving wires through the split in the ring, each vertical jumper retaining ring being set at an oblique angle relative to the vertical to define a portion of the respective vertical jumper path, and a guide pin mounted on the upper portion of a block module, said guide pin being substantially metrical for positioning wires from a cable positioned in the U-channel.

* * * * *

UNITED STATES PATENT AND TRADEMARK OFFICE
CERTIFICATE OF CORRECTION

PATENT NO. : 5,153,819
DATED : October 6, 1992
INVENTOR(S) : Hebel

It is certified that error appears in the above-identified patent and that said Letters Patent is hereby corrected as shown below:

Claim 1, Column 6, Line 21, cancel "upright plane, a set of terminating blocks mounted on each of" and substitute -- a plurality of block modules mounted on one side of the uprights, --

Claim 10, Column 10, Line 45, cancel "and"

Claim 17, Column 14, Line 55, cancel "metrical" and substitute -- vertical --

Signed and Sealed this

First Day of March, 1994

*Attest:*

BRUCE LEHMAN

*Attesting Officer*  Commissioner of Patents and Trademarks